US012784029B1

(12) United States Patent
Warnick et al.

(10) Patent No.: US 12,784,029 B1
(45) Date of Patent: Nov. 3, 2026

(54) DIGITAL WALLET SECURE COMMUNICATION TECHNIQUES

(71) Applicant: United Services Automobile Association (USAA), San Antonio, TX (US)

(72) Inventors: Mark Paxman Warnick, San Antonio, TX (US); Will Kerns Maney, New York City, NY (US); Elena Marie Carrasco, Converse, TX (US); Nathan Lee Post, Rockport, TX (US); Nolan Serrao, Plano, TX (US); Roberto Virgillio Jolliffe, San Antonio, TX (US); David Michael Schlittler, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 269 days.

(21) Appl. No.: 18/326,768

(22) Filed: May 31, 2023

(51) Int. Cl.
*G06Q 20/36* (2012.01)

(52) U.S. Cl.
CPC .................................. *G06Q 20/36* (2013.01)

(58) Field of Classification Search
CPC ................................................ G06Q 20/36
See application file for complete search history.

(56) References Cited

U.S. PATENT DOCUMENTS

| | | | | |
|---|---|---|---|---|
| 11,367,434 | B2 * | 6/2022 | Lee | G10L 15/22 |
| 2006/0218651 | A1 * | 9/2006 | Ginter | G06F 21/33 375/E7.009 |
| 2010/0125495 | A1 * | 5/2010 | Smith | G06Q 20/3223 705/26.1 |
| 2010/0125510 | A1 * | 5/2010 | Smith | G06Q 20/425 705/17 |
| 2013/0304642 | A1 * | 11/2013 | Campos | G06Q 20/3572 705/41 |
| 2014/0143089 | A1 * | 5/2014 | Campos | G06Q 30/0633 705/26.8 |
| 2014/0195425 | A1 * | 7/2014 | Campos | G06Q 20/4018 705/41 |
| 2015/0348018 | A1 * | 12/2015 | Campos | G06Q 20/18 705/41 |
| 2017/0351771 | A1 * | 12/2017 | Gallenbacher | G06F 16/538 |
| 2017/0352024 | A1 * | 12/2017 | Klenoff | G06F 16/43 |

OTHER PUBLICATIONS

A System For Payment Via Electronic Wallet (Year: 2012).*
System and Method for Issuing a Loan to a Consumer Determined to Be Creditworthy (Year: 2018).*

(Continued)

*Primary Examiner* — Patrick Mcatee
(74) *Attorney, Agent, or Firm* — Fletcher Yoder P.C.

(57) ABSTRACT

A digital wallet of a user may be associated with a unique digital wallet language that is stored on a user device. When the user device receives a request at the user device to establish a digital wallet, a unique digital wallet language can be generated at the user device. The unique digital wallet language can be used to conduct internal transactions within the digital wallet, while external transactions of the digital wallet use a different language than the unique digital wallet language.

20 Claims, 5 Drawing Sheets

(56) References Cited

OTHER PUBLICATIONS

Electronic Wallet Checkout Platform Apparatuses, Methods and Systems (Year: 2012).*
Systems, Methods and Devices for Transmitting Electronic Giftcards (Year: 2013).*
Real-Time Authorization of Initiated Data Exchanges Based on Dynamically Generated Tokenized Data (Year: 2018).*
Edit Automation Using an Anchor Target List (Year: 2022).*
Virtualization and Secure Processing of Data (Year: 2013).*
System for Registering Stored-value Card Into Electronic Wallet, Has Digital Sticker, Which Conveys Transaction Information of Electronic Stored-value Card to Processor or Issuer of Electronic Stored-value Card Through Network (Year: 2013).*

* cited by examiner

DIGITAL WALLET SECURE COMMUNICATION TECHNIQUES

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Electronic commerce consists of the buying and selling of products or services over electronic systems. A digital wallet (also known as an e-wallet) allows users to make electronic commerce transactions quickly and securely. A digital wallet provides users with a convenient way to conduct electronic transactions.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a digital wallet communication system is provided. The system includes a user device. The user device includes a memory and one or more processors. The one or more processors are configured to receive a request at the user device to establish a digital wallet; generate a unique digital wallet language at the user device; set one or more subwallets of the digital wallet using the unique digital wallet language; conduct internal transactions within the digital wallet using the unique digital wallet language; and store the unique digital wallet language in the memory/The user device also includes communication circuitry configured to communicate external transactions of the digital wallet using a different language than the unique digital wallet language.

In one embodiment, a digital wallet communication method includes receiving a request to generate a digital wallet at a user device associated with a user; generating, at the user device, a unique digital wallet language comprising one or more commands; generating the digital wallet using the one or more commands; receiving a transaction instruction; and updating an internal configuration of the digital wall using the one or more commands of the unique digital wallet language based on the transaction instruction In one embodiment, a digital wallet communication system includes a remote device or serve configured to manage digital assets of a digital wallet associated with a user. The system also includes computer-readable media of the remote device or server. Instructions of the computer-readable media cause one or more processors to provide a digital wallet software application to a user device of the user, wherein the digital wallet software application comprises a machine learning model, wherein the machine learning model is configured to output a unique digital wallet language used by a digital wallet controller of the user device; and communicate with the user device to manage transactions of the digital wallet using a different language than the unique digital wallet language

BRIEF

Description of the Drawings

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation—specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment"

or "an embodiment" of the present disclosure are not intended to be interpreted as excluding the existence of additional embodiments that also incorporate the recited features.

Provided herein are secure digital wallet communication systems that provide secure and opaque communications within a user's digital wallet. In one embodiment, intrawallet operations or commands, such as communication and/or transactions, are based on a unique digital wallet language that, in embodiments, can be generated locally on a user device. In an embodiment, the by a machine learning model or an artificial intelligence system. The unique digital wallet language may be locally generated and/or stored in an embodiment, such that even the external party providing wallet storage and the digital wallet interaction interface does not have access to the language and, therefore, cannot obtain visibility into wallet organization. In this manner, a user can organize a digital wallet according to user preferences into desired subfolders without the organization being visible to other parties. These subfolders can be interacted with within the digital wallet using the personalized unique command language, such that the interactions are not resolvable by a third party, thus proving secure digital wallet communications.

The disclosed embodiments are directed to solving problems specific to computing technologies. For example, because electronic communications may be digitally intercepted, the disclosed techniques provide security measures that obscure electronic communications to prevent fraud or theft in digital transactions.

Figure 1:
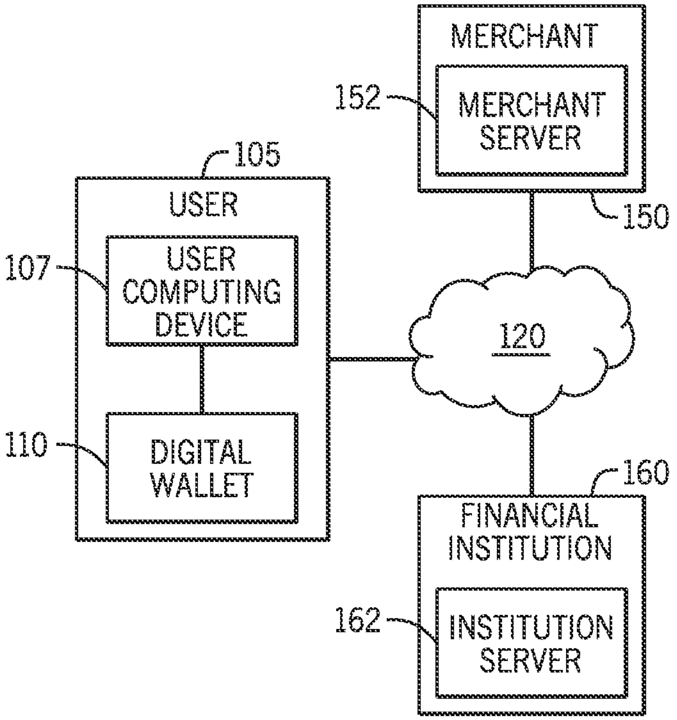
FIG. 1 is a block diagram of an implementation of a system that may be used in conjunction with a digital wallet communication system, in accordance with an embodiment of the present disclosure.

FIG. 1 is a block diagram of an implementation of a system 100 in which example embodiments and aspects may be implemented. The system 100 may include a user 105 and one or more merchants 150 and one or more financial institutions 160. The merchants 150 or financial institutions may have an associated website or user interface controlled under instructions from a server 152, 162, respectively. The user 105 may visit one of the websites 152, 162 via a browser on a user computing device 107 and make an online purchase or financial transactions.

The user computing device 107 may comprise any type of computing device, such as a personal computer (PC), a handheld computing device, a personal digital assistant (PDA), a smartphone, or a mobile phone, for example. An example user computing device is described with respect to FIG. 9.

The user 105, via the user computing device 107, may communicate with the servers 152, 162 of the merchants 150 or financial institutions 160, respectively, by way of a communications network 120 such as an intranet, the Internet, a local area network (LAN), a wide area network (WAN), a wireless fidelity (WiFi) network, a public switched telephone network (PSTN), a cellular network, a voice over Internet protocol (VOIP) network, and the like.

The user 105 may access a merchant by opening a communication pathway via the communications network 120 using the user computing device 107. There may be several ways in which the communication pathway may be established, including, but not limited to, an Internet connection via a website of the merchant. The user 105 may access the website and log into the website using credentials, such as, but not limited to, a username and a password.

The user 105 may be an individual or entity who maintains a digital wallet 110 that may be accessed via a software application (e.g., a dedicated application or app, a web-based application operating on a web browser) operating on the user computing device 107. The digital wallet 110 may store account information pertaining to various accounts of the user 105. The account information may be related to funding sources, reward programs, loyalty programs, retailers and other merchants, etc. The account information may comprise account numbers, PIN (personal identification number) numbers, expiration dates, security numbers and codes, passwords and other data related to credentials and authentication, entity and account names and user names, shipping and billing addresses, telephone numbers of the account owner and/or the account issuer, contact information, birthdates, membership information, calling card information, medical and health information, travel club information, security verification questions and their answers, insurance cards, driver license information, voter registration information, etc.

In an implementation, the digital wallet 110 may be deployed on multiple user computing devices of the user 105. The multiple digital wallets may be synchronized among the various computing devices in order to keep the account information current. In an embodiment, each device has its own digital wallet language as provided herein.

The digital wallet 110 may be transferred to a storage media such as a SIM (subscriber identity module) card, USB (universal serial bus) drive, SD (secure digital) card, etc. The digital wallet 110 may be transferable to various computing devices (e.g., phones, PDAs, etc.) of the user 105 so these devices may be used to provide funding source information to complete a transaction. For example, a phone of a user 105 may act as a wallet, replacing a physical wallet that the user carries, thereby becoming a "physical wallet".

The digital wallet 110 may be stored in storage at the client side, e.g., local to the user computing device 107. In this manner, there may be a single repository of funding and the user does not have to trust the storage of their personal and sensitive data to another party such as a merchant or a third party payment facility. In an implementation, the digital wallet 110 and the account information may be stored in encrypted form on a local file system. Any known encryption technique(s) may be used. In an implementation, 256-bit AES (advanced encryption standard) encryption may be used.

Although examples described herein with respect to a digital wallet 110 may refer to merchants 150 and/or financial institutions160, the digital wallet 110 may be used at other entities, both physical and online. For example, such usage may include accessing and utilizing accounts relating to airline miles and points, hotel points, digital content subscriptions, and points and awards pertaining to any reward program or loyalty program.

In one example, a digital wallet 110 of a user may include various subwallets. A subwallet may be characterized by category (e.g., savings, spending, house fund), by asset or currency type (e.g., digital asset, cryptocurrency, domestic or foreign currency, multiple currencies), and/or by permission structures (e.g., a parent-child custodial subwallet) In an embodiment, a subwallet is a separate wallet within a digital wallet. By way of example, a digital wallet 110 may include a mix of one or more subwallets, such as a crypto subwallet, a stock trading subwallet, and a foreign currency subwallet. For certain users, the identity and organization of the digital wallet can provide insight into financial goals, which the user may wish not to share with any other parties.

Figure 2:
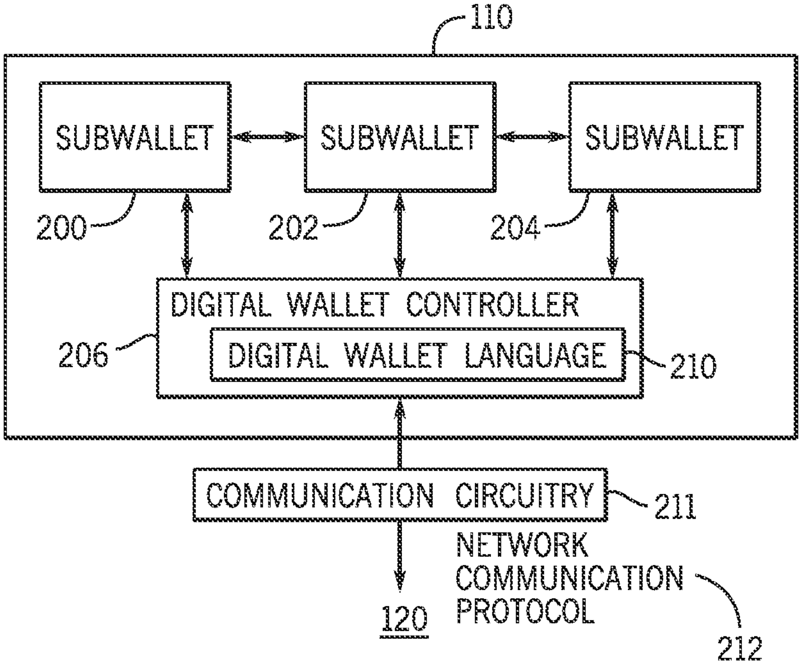
FIG. 2 is a block diagram of an implementation of a digital wallet communication system, in accordance with an embodiment of the present disclosure.

FIG. 2 is a schematic illustration of an arrangement of the digital wallet 110. The illustrated digital wallet includes one or more subwallets, illustrated as subwallets 200, 202, 204. Certain operations of the digital wallet 110 are controlled by the digital wallet controller 206, which may be provided locally on the user device 107 or may be communicated via the network 120. In certain embodiments, the digital wallet controller 206 operates using a digital wallet language 210. The digital wallet language 210 may be generated de novo for a particular user 105 and/or a particular user device 107. That is, an individual user device 107 may have its own digital wallet language 210, while a different user device 107 of the user may have a separate and different digital wallet language 210.

The digital wallet language 210 may be stored in a memory of the user device 107 such that the digital wallet language can be both created and stored locally and such that the digital wallet language is, in an embodiment, not communicated using a network communication protocol 212 over the network 120. In certain embodiments, the digital wallet language 210 is not compatible with the network communication protocol 212. Thus, in embodiments, the digital wallet language 210 can be used for internal wallet operations while the network communication protocol 212 may be a standardized protocol for external communications. In an embodiment, the the network communication protocol 212 may be implemented in C, C++, Java, Python, or a conventional or standardized programming language. The controller 206 can identify the appropriate protocol and/or command language in which the network communication protocol 212 is implemented based on the context.

For example, communication between the subwallets 200, 202, 204 as well as communication between an individual subwallet and the controller 206 can be conducted using the digital wallet language 210. These communications may include operations such as creation or establishment of a subwallet, transfers between subwallets, or designation of a particular subwallet to hold an asset in the wallet 110. By maintaining a unique language, these communications are more secure from outside undesired access or infiltration. Even if internal communications were inappropriately accessed, the communications themselves would not be understandable, because the access would only reveal the commands and naming conventions that are executed in the unique language. However, the language itself, which is unique to the user, would not be understandable.

In embodiments, the digital wallet language 210 may be a compiled or interpreted language. In an embodiment, the digital wallet language 210 is based on a base language with a modified component. For example, the digital wallet language 210 may include a modified lexer that has modified tokenizing rules unique to the digital wallet language 210 or may include a modified set of commands. In an embodiment, the digital wallet language 210 may use unique tokens or may use tokens in manner contrary to conventional use. For example, tokens may include keyboard mathematical operators that do not correspond to their conventional functions. The "+" operator may be randomized to correspond to one of a set of other mathematical functions such as "–" "*" ">", etc., as one element of the digital wallet, language 210. The digital wallet language 210 may replace conventional commands with a different set of words. For example, a set of C++ commands may be instead replaced by types of fruits, animals, or other words. The translation and selection of words to replace the commands are unique to the digital wallet language 210 and may be generated and/or stored by the digital wallet controller 206.

The digital wallet controller 206 may operate to use the unique commands of the digital wallet language 210 as input to a compiler to produce desired output of machine-executable code. In certain embodiments, the digital wallet language 210 may be a modified version of the network communication protocol 212 in which certain commands of the network communication protocol 212 are substituted with unique commands of the digital wallet language 210. The digital wallet controller 206 may include a translator or dictionary to translate the commands of the network communication protocol 212 to the appropriate set of commands for the digital wallet language 210.

Figure 3:
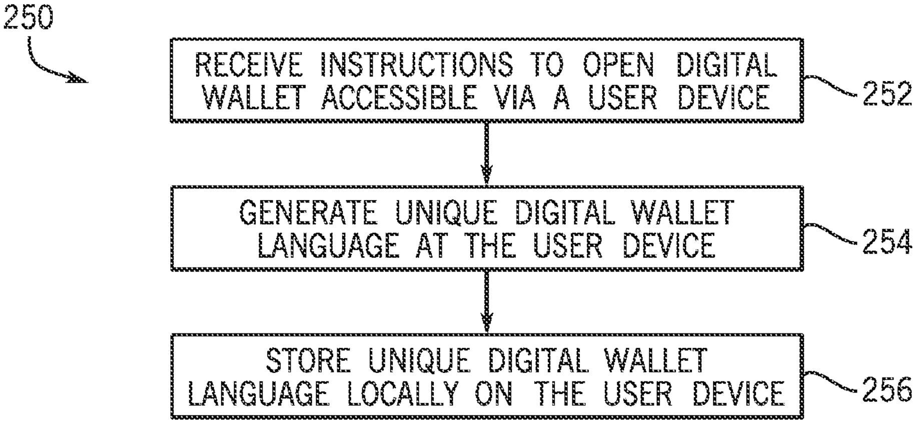
FIG. 3 is a flow diagram of a method of digital wallet communication, in accordance with an embodiment of the present disclosure.

FIG. 3 shows a flow diagram of a method 250 of creating a digital wallet language 210. The method 250 is discussed with reference to elements illustrated in FIGS. 1-2. The method 250 may be implemented using computer-readable instructions stored in the at least one memory and executed by the at least one processor (see FIG. 8) of the system 100.

At step 252, the system 100 receives instructions to open a digital wallet 110 that is accessible via the user device 107. In certain cases, the request originates from the user device 107. In an embodiment, the request may originate from a remote device. Upon receiving the request, a unique digital wallet language 210 is created using the digital wallet controller 206 at step 254. The unique digital wallet language 210 is stored locally on the user device 107 at step 256.

The unique digital wallet language 210 may include a set of commands and rules that is unique to the digital wallet. In an embodiment, each digital wallet 110 may operate according to a fixed set of available operations. In an embodiment, the available operations may be custom and set by the user. For example, certain wallets may have customized permissions or sharing, expiring permissions, or may be customized to only particular asset types. Thus, the different languages 210 may differ as to the accepted meaning of particular operators and/or a correct syntax that is accepted.

Table 1 shows example commands for one example digital wallet language 210. A particular function, such as naming a subwallet, is designated by a unique number string. In embodiments, each different wallet 110 may use a different number string that is randomly generated to operate as the "name subwallet" command. However, in certain embodiments, the different digital wallet languages 210 may have different types of potential commands. Other digital wallet language 210 may use combinations of words or phrases instead as the command for the "name subwallet" command, and the rules to generate the language 210 may be set locally by the digital wallet controller 206.

TABLE 1

Digital Wallet Commands

| Command Function | Digital Wallet Language |
|---|---|
| Name subwallet | 12345678 |
| Add asset to a subwallet | Apple Blue |
| Transfer asset between subwallets | Xyz456 |
| Create new subwallet | + – > |
| Delete subwallet | Fox Ontario |

The digital wallet language 210 may be generated de novo at the time of wallet establishment or interaction on the user device 107 and may be maintained and used over the lifetime of the wallet 110 or may be refreshed and regenerated periodically.

Figure 4:
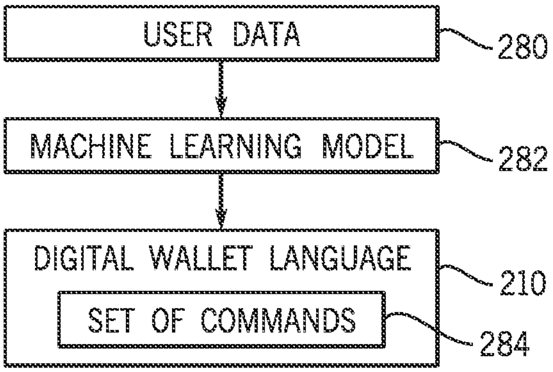
FIG. 4 is a schematic illustration of operations of a digital wallet communication system, in accordance with an embodiment of the present disclosure.

FIG. 4 is an example of generation of the digital wallet language 210 using machine learning or artificial intelligence. The unique digital wallet language 210 is unique between users and/or individual devices such that two different users may have their own unique respective languages 210 and will not share the same language 210. The digital wallet language 210 may be generated using a randomizer to randomly select commands of the language 210.

In an embodiment, user data 280 resident on the user device 107 may be provided as input to a machine learning model 282 to generate the digital wallet language 210 and, for example, a unique set of commands 284. In one example, the architecture of the machine learning model 282 is a same architecture between different users. However, the respective different user data 280 feed into the same machine learning model 282 generates respective different digital wallet languages 210. The machine learning model 282 may include pre-existing command functions, and the inputs to the model 282 may define the rules, such as the commands and/or syntax, to cause execution of the operations.

In an embodiment, the user data is a randomly selected image from an image library. Image data of the image (pixel data, pixel intensity) is extracted and used to set variables of the machine learning model 282. In an example, intensity values or color values of 64 different pixels are extracted. The individual commands are based on the different intensity or color values. The machine learning model 282, or its functions, may be operated directly on the user device 107 such that the generation of the digital wallet language 210 is maintained locally.

Figure 5:
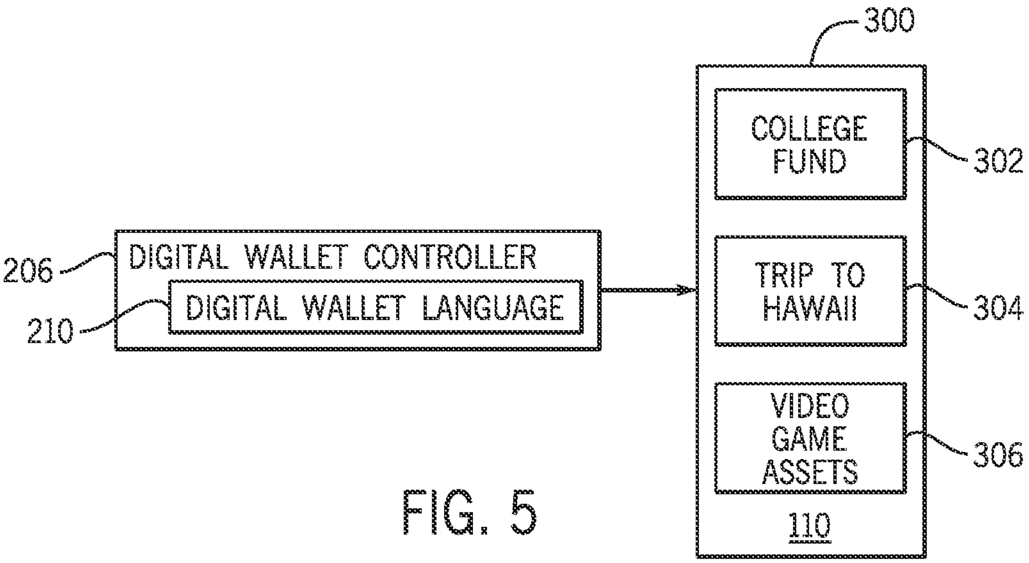
FIG. 5 is an example user interface of a digital wallet generated by a digital wallet communication system in accordance with an embodiment of the present disclosure.

FIG. 5 is an example user interface 300 that may be generated or caused to be displayed on the user device 107. The digital wallet 110 may be accessed via the user computing device 107 In an implementation, the user 105 may provide authentication information, such as a username and password. If authenticated, the user 105 may be provided with access to the digital wallet 110. Operations of the digital wallet 110 are conducted using the digital wallet language 210.

The user interface 300 may be provided as a display screen of a software application or in a web-based browser. Pursuant to appropriate authentication, the digital wallet 110 may be provided anywhere on the display. The user 105 may access or interact with various subwallets, shown as subwallets 302, 304, 306. For example, clicking on a particular subwallet may open the subwallet to be displayed on the user interface 300. Once open, the assets of the subwallet are displayed, and different interactions can be executed.

In an implementation, the digital wallet language 210, under control of the digital wallet controller 206, may allow the user to create and name subwallets, shown by way of example as subwallets 302, 304, 306. These names may be private names unique to the user. Accordingly, an end user may not wish to permit the digital wallet management system or a third party to view these names. Thus, the digital wallet language 210, unique to the user device 107, may provide unique commands for creating subwallets as well as naming them.

Figure 6:
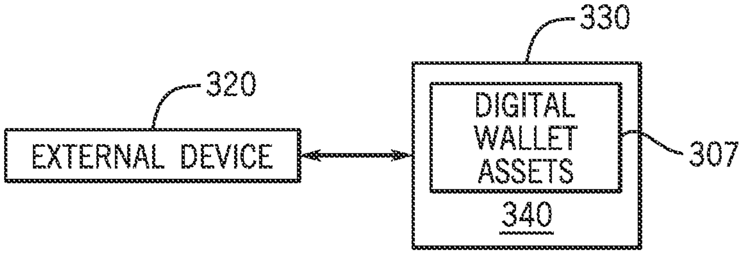
FIG. 6 is an example a digital wallet configuration visible to an system in accordance with an embodiment of the present disclosure.

However, a third party interacting with the digital wallet 110, e.g., by participating in a transaction with the digital wallet 110, would not be able to see the subwallets 302, 304, 306. FIG. 6 is an example of interaction of the digital wallet 110 with an external device 320. The external device is able to view the digital wallet assets 307 via an interface 330, but not the internal configuration of the subwallets 302, 304, 306, which are generated by the digital wallet language 210 and private to the user device 107.

Figure 7:
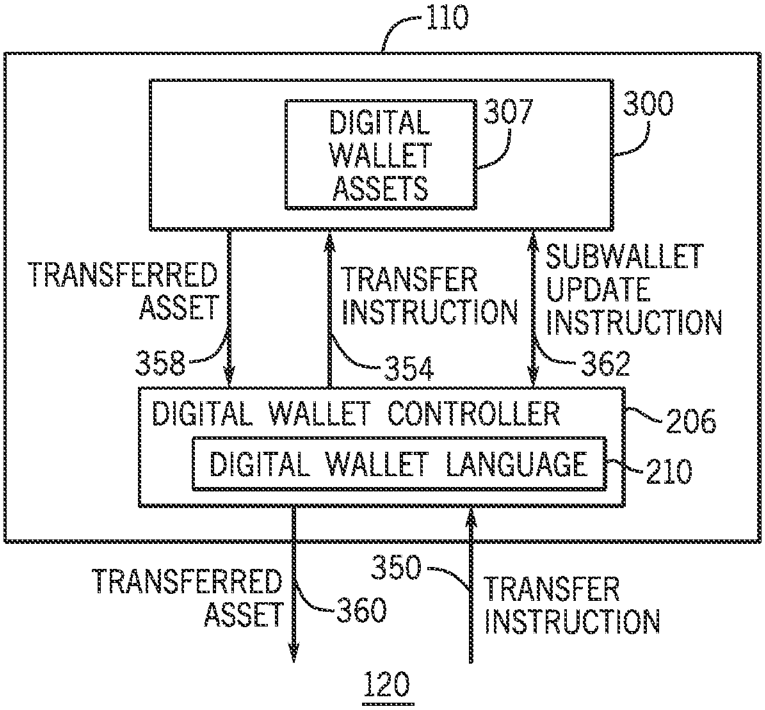
FIG. 7 is a schematic illustration of operations to configure a digital wallet of a digital wallet communication pathways of a digital wallet communication system in accordance with an embodiment of the present disclosure.

FIG. 7 shows various communications in a digital wallet communication system as provided herein. A transfer instruction 350 is received from a user interface on the device 107 or from an external device 320. The transfer instruction 350 is provided to the digital wallet controller 206, which translates the instruction into a command of the digital wallet language 210. Subsequent intrawallet operation instructions are conducted in the digital wallet language 210, such as the internal transfer instruction 354, and instructions/validation of the transferred asset 358. Communication outside of the digital wallet 110 with the network 120 is conducted in a different language to permit transfer of the transferred asset 360 outside of the digital wallet 110. After the transfer, the digital wallet assets 307 and subwallet distribution are updated with a subwallet update instruction 362.

Figure 8:
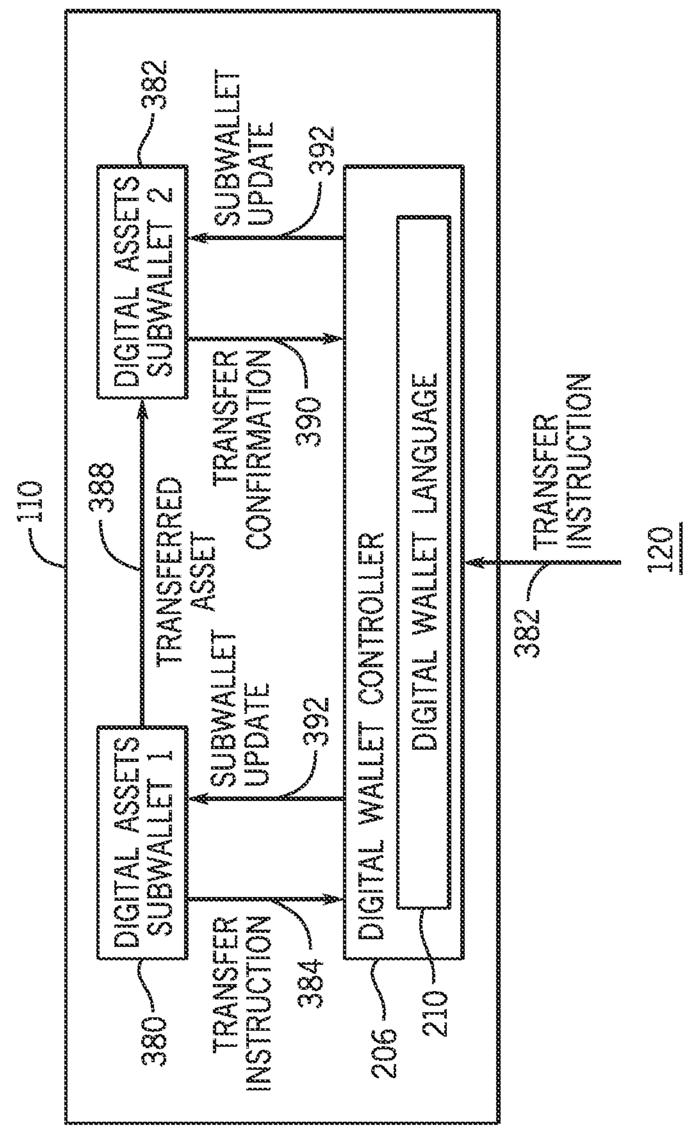
FIG. 8 is a schematic illustration of operations to configure a digital wallet of a digital wallet communication pathways of a digital wallet communication system in accordance with an embodiment of the present disclosure.

FIG. 8 shows communications to change an internal configuration of asset distribution in a digital wallet communication system as provided herein. A transfer instruction 382 is received from a user interface on the device 107 or from an external device 320. The transfer instruction 3382 is provided to the digital wallet controller 206, which translates the instruction into a command of the digital wallet language 210. Subsequent intrawallet operations are provided in the digital wallet language 210, such as the internal transfer instruction 384, transfer of the asset 388, transfer confirmation 390 and subwallet updates 392.

Figure 9:
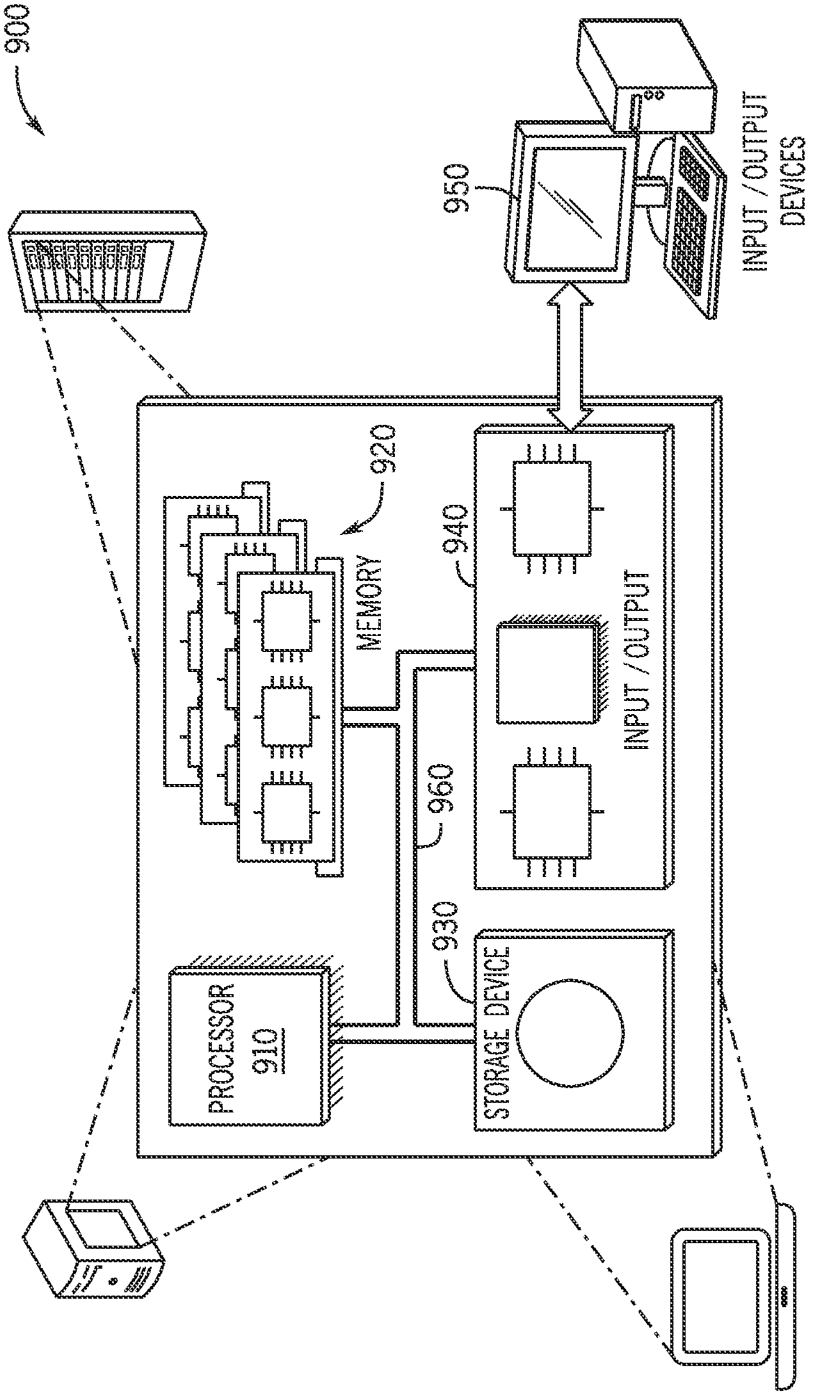
FIG. 9 is a schematic illustration of an example computing system, in in accordance with an embodiment.

FIG. 9 illustrates an example computing system 900 that the embodiments described herein may use to perform their respective operations. The system 900 may be used for any of the operations described with respect to the various embodiments described herein, including the digital wallet communication system 100 described herein. For example, the system 900 may be included, at least in part, in one or more of computing device(s) or system(s) described herein. In certain embodiments, the system 900 may include one or more processors 910, one or more memory 920, one or more storage devices 930, and one or more input/output (I/O) devices 950 controllable via one or more I/O interfaces 940. The various components 910, 920, 930, 940, or 950 may be interconnected via at least one system bus 960, which may enable the transfer of data between the various modules and components of the system 900.

In certain embodiments, the processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. For example, the processor(s) 910 may execute instructions for the various software module(s) described herein. The processor(s) 910 may include hardware-based processor(s) each including one or more cores. The processor(s) 910 may include general purpose processor(s), special purpose processor(s), or both.

In certain embodiments, the memory 920 may store information within the system 900. In certain embodiments, the memory 920 includes one or more computer-readable media. The memory 920 may include any number of volatile memory units, any number of non-volatile memory units, or both volatile and non-volatile memory units. The memory 920 may include read-only memory, random access memory, or both. In certain embodiments, the memory 920 may be employed as active or physical memory by one or more executing software modules.

In certain embodiments, the storage device(s) 930 may be configured to provide (e.g., persistent) mass storage for the system 900. In certain embodiments, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In certain embodiments, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 910 and the memory 920 may be supplemented by, or incorporated into, one or more application-specific integrated circuits (ASICs).

In certain embodiments, the system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900 or may be external on one or more computing devices of the system 900.

In certain embodiments, the system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-832 standard for serial ports, or with a version of the IEEE AA884 standard for parallel ports. As another example, the I/O interface(s) 940 may be configured to provide a connection over Universal Serial Bus (USB) or Ethernet. In certain embodiments, the I/O interface(s) 940 may be configured to provide a serial connection that is compliant with a version of the IEEE AA994 standard.

In certain embodiments, the I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more communication networks using any network protocol.

Computing devices of the system 900 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

Functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages as well as the digital wallet language 210 provided herein, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 900 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 900 that includes a back-end component, e.g., as a data server, or that includes a middleware component, e.g., an application server, or that includes a front-end component, e.g., a client computer having a graphical user interface or a web browser through which a user may interact with an with the system 900, or any appropriate combination of one or more such back-end, middleware, or front end components. The components of the system 900 may be interconnected by any appropriate form or medium of digital data communication, e.g., a communication network. Examples of communication networks include a local area network ("LAN") and a wide area network ("WAN"), e.g., the Internet.

In certain embodiments, the computing system 900 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A digital wallet communication system comprising:

a user device comprising;

a memory;

one or more processors configured to:

receive a request at the user device to establish a digital wallet;

generate a unique digital wallet language at the user device, wherein the unique wallet language comprises a plurality of operations that control communication and transactions of the digital wallet;

set one or more subwallets of the digital wallet using the unique digital wallet language;

conduct internal transactions within the digital wallet using the unique digital wallet language; and store the unique digital wallet language in the memory; and communication circuitry configured to communicate external transactions of the digital wallet over a network using a different language than the unique digital wallet language and wherein the unique digital wallet language is not communicated from the user device over the network.

2. The digital wallet communication system of claim 1, wherein the one or more processors are configured to update a configuration of the digital wallet at the user device based on the external transactions.

3. The digital wallet communication system of claim 2, wherein the configuration comprises a distribution of digital assets between the one or more subwallets.

4. The digital wallet communication system of claim 2, wherein the configuration comprises a name or designation of the one or more subwallets.

5. The digital wallet communication system of claim 2, wherein the configuration comprises permissions of the one or more subwallets.

6. The digital wallet communication system of claim 1, wherein the unique digital wallet language comprises a set of commands that is stored locally on the memory.

7. The digital wallet communication system of claim 6, wherein the set of commands is not communicated as part of the external transactions.

8. The digital wallet communication system of claim 1, wherein the unique digital wallet language is generated based on user data accessed from the memory.

9. The digital wallet communication system of claim 8, wherein the user data is selected at random.

10. The digital wallet communication system of claim 8, wherein the user data is selected at random based on an image library of the user.

11. The digital wallet communication system of claim 1, wherein the one or more processors are configured to execute instructions of a software application operating on the user device to generate the unique digital wallet language, wherein the instructions comprise a machine learning model.

12. The digital wallet communication system of claim 11, wherein the machine learning model comprises one or more variables that are set based on user data accessed from the memory.

13. The digital wallet communication system of claim 10, wherein the machine learning model operates on the user device.

14. The digital wallet communication system of claim 1, wherein the internal transaction is conducted based on user input at the user device.

15. The digital wallet communication system of claim 14, wherein the internal transaction is received in the unique digital wallet language from the user device.

16. The digital wallet communication system of claim 1, wherein the unique digital wallet language comprises a lexer with modified tokenizing rules.

17. The digital wallet communication system of claim 1, wherein the unique digital wallet language comprises unique commands or syntax that differ between the user and other users.

18. The digital wallet communication system of claim 1, wherein the one or more processors are configured to use a randomizer to randomly select commands of the unique digital wallet language.

19. The digital wallet communication system of claim 1, wherein the external transactions are communicated over the network from the user device in the different language.

20. The digital wallet communication system of claim 1, wherein the request is received at a digital wallet interaction interface, wherein the digital wallet interaction interface does not have access to the unique digital wallet language.

* * * * *